United States Patent
Aoki

(10) Patent No.: US 8,184,205 B2
(45) Date of Patent: May 22, 2012

(54) ELECTRO-OPTICAL DEVICE AND ELECTRONIC APPARATUS

(75) Inventor: Toru Aoki, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 1340 days.

(21) Appl. No.: 11/780,983

(22) Filed: Jul. 20, 2007

(65) Prior Publication Data

US 2008/0129893 A1 Jun. 5, 2008

(30) Foreign Application Priority Data

Nov. 30, 2006 (JP) ................ 2006-323106

(51) Int. Cl.
*H04N 5/14* (2006.01)
*G09G 5/10* (2006.01)
(52) U.S. Cl. ............... 348/671; 345/690
(58) Field of Classification Search ............. 348/671
See application file for complete search history.

(56) References Cited

U.S. PATENT DOCUMENTS

| 6,670,944 B1* | 12/2003 | Ishii ................. 345/100 |
| 2006/0012555 A1* | 1/2006 | Tokumura ............ 345/98 |
| 2006/0044296 A1* | 3/2006 | Murade ............. 345/204 |

FOREIGN PATENT DOCUMENTS

| JP | A-2002-116735 | 4/2002 |
| JP | A-2005-202159 | 7/2005 |
| JP | A-2006-091800 | 4/2006 |
| JP | A-2006-162872 | 6/2006 |
| JP | A-2006-163074 | 6/2006 |

* cited by examiner

*Primary Examiner* — Jefferey Harold
*Assistant Examiner* — Michael Teitelbaum
(74) *Attorney, Agent, or Firm* — Oliff & Berridge, PLC

(57) ABSTRACT

An electro-optical device includes configuration to apply, to a plurality of the data lines through capacitors, inverted data signals that are generated by inverting voltage levels of data signals supplied to image signal lines with respect to a predetermined electric potential.

4 Claims, 9 Drawing Sheets

OUTPUT DIRECTION OF SAMPLING SIGNAL ⟶

ELECTRO-OPTICAL DEVICE AND ELECTRONIC APPARATUS

BACKGROUND

1. Technical Field

The present invention relates to technology for preventing degradation of display quality due to so-called horizontal crosstalk.

2. Related Art

Recently, projectors that form reduced images using electro-optical panels such as liquid crystals and project the reduced images on an enlarged scale using optical systems have been used. The projectors do not have a function of generating an image and are supplied with image data (or an image signal) from higher-level devices such as PCs or television tuners. The image data is used for designating gray scale levels brightness) of pixels for each pixel. Since the image data is supplied in the form of vertical and horizontal scanning of pixels arranged in the shape of a matrix, it is appropriate to drive a display panel used in the protectors by using a method corresponding to such scanning.

Generally, display panels used in the projectors are driven by using a dot sequential method in which scanning lines are sequentially selected in a predetermined order, data lines are sequentially selected in a period (one horizontal scanning period) when one scanning line is selected, and data signals generated from converting image data appropriately for driving the liquid crystal are supplied to the selected data line.

In addition, recently, a phase development method has been proposed in which the data lines are grouped into blocks of two or more data lines, the blocks are sequentially selected each horizontal scanning period, and data signals are supplied to the data lines belonging to the selected block, for the display of a high-definition image such as a high-vision image.

However, when the above-described display panel is driven by using the dot sequential method or the phase development method there is a problem that degradation of display quality due to what is referred to as "horizontal crosstalk" occurs. The horizontal crosstalk herein is a phenomenon that, for example, in a case where a black (the lowest luminance or the vicinity thereof) rectangular area is displayed as a window over a gray (medium gray scale level) background in the normally-white mode, a gray area adjacent to the black area in a horizontal scanning direction is displayed with brightness different from that of other gray parts.

The horizontal crosstalk can be suppressed to some degree by signal processing for the image data designating gray scale levels of pixels so as to correct voltage levels of the data signals applied to pixel electrodes (for example, see JP-A-2002-116735).

However, when a configuration is used in which the voltage levels of the data signals are corrected, the generation of the horizontal crosstalk can be suppressed, but an additional circuit for signal processing in a correction process is required, whereby the structure of the device becomes complicated.

SUMMARY

An advantage of some aspects of the invention is that provides an electro-optical device capable of suppressing the horizontal crosstalk using a simple structure and displaying high-quality images, a driving method thereof, and an electronic apparatus in which the electro-optical device is used for a display unit thereof.

According to an aspect of the invention, there is provided an electro-optical device including: pixels that are provided at intersections of a plurality of scanning lines and a plurality of data lines and have gray scale levels in accordance with voltage levels of data signals supplied to the data lines corresponding to the pixels at a time when the scanning lines corresponding to the pixels are selected; sampling switches that are provided in the plurality of data lines and sample data signals, which are supplied to image signal lines and have voltage levels between a high voltage level and a low voltage level with respect to a predetermined reference electric potential, to the data lines corresponding to the sampling switches in accordance with sampling signals; a scanning line driving circuit that sequentially selects each of the plurality of scanning lines in a predetermined order; a sampling signal output circuit that sequentially outputs sampling signals in a predetermined order to each data line or to each two or more data lines grouped into blocks; and capacitors that are provided in the plurality of data lines and, first ends of which are connected to the data lines corresponding to the capacitors and second ends of which are connected to inverted image signal lines to which inverted are supplied data signals generated by inverting the voltage levels of the data signals supplied to the image signal lines with respect to a predetermined electric potential. While voltage level changes of the data signals supplied to the image signal lines are transmitted to the data lines through parasitic capacitance at a time when sampling of the data signals to the data line performed by the sampling switches are completed, the voltage level changes are offset by voltage level changes of the inverted data signals supplied to the inverted image signal lines in the aspect above.

In the aspect above, the sampling switches may be first transistors, gate electrodes of which are supplied with the sampling signals, source electrodes of which are connected to the image signal lines, and drain electrodes of which are connected to the data lines, and the capacitors may be second transistors in a turned off status that are interposed between the inverted image signal lines and the data lines. In addition, the second transistors may connect the data lines corresponding thereto to the inverted image signal lines at a time when the sampling signals are output in a test mode and become in a turned off status in a display mode.

The present invention may be applied as a method of driving an electro-optical device or an electronic apparatus having the electro-optical device as a display unit thereof other than the electro-optical device.

BRIEF DESCRIPTION OF THE DRAWINGS

The invention, will be described with reference to the accompanying drawings, wherein like numbers reference like elements.

DESCRIPTION OF EXEMPLARY EMBODIMENTS

Hereinafter, embodiments of the present invention will be described with reference to the accompanying drawings.

First Embodiment

Figure 1:
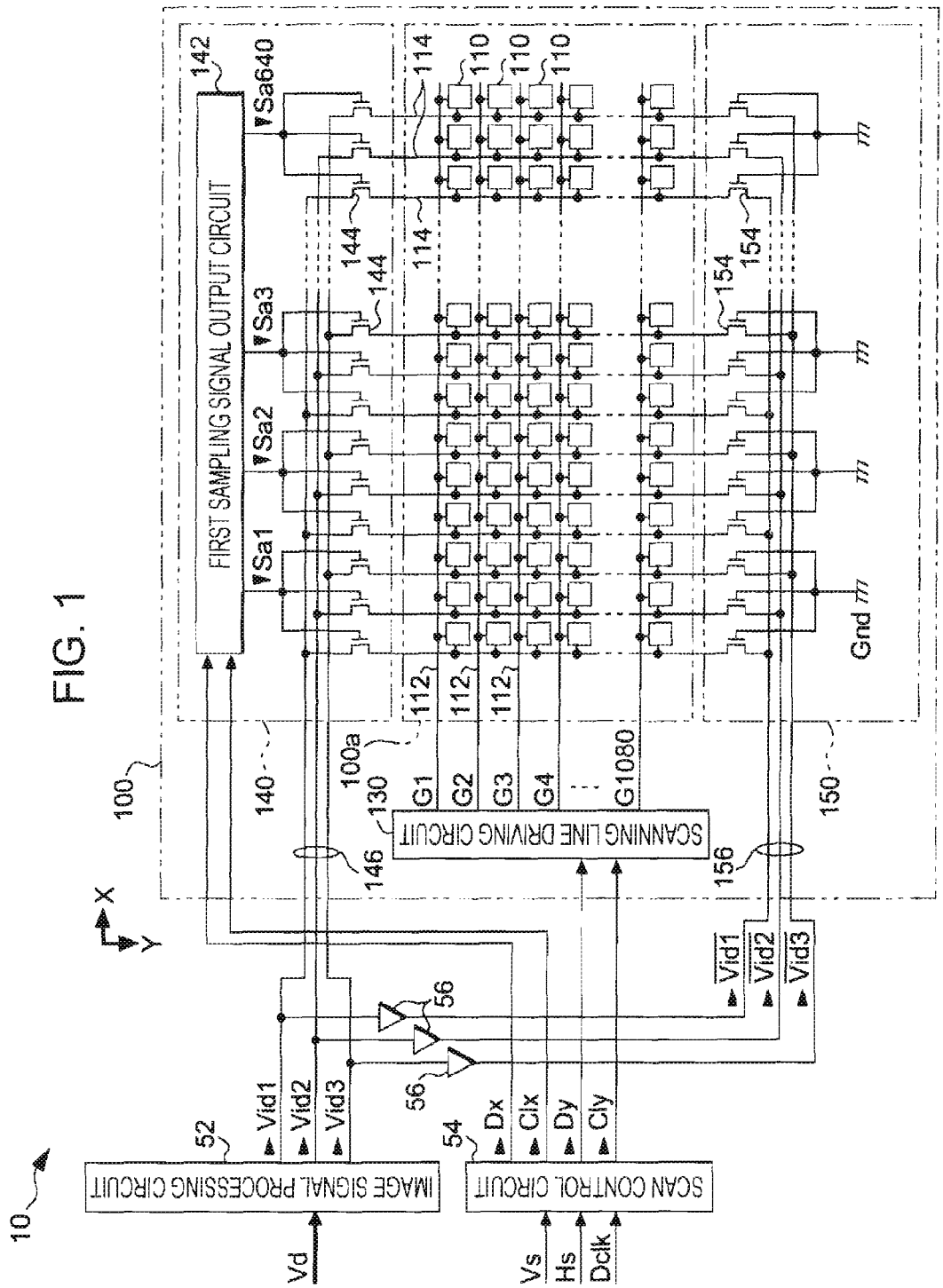
FIG. 1 is a block diagram showing the overall structure of an electro-optical device according to a first embodiment of the invention.

FIG. 1 is a block diagram showing the overall structure of an electro-optical device according to a first embodiment of the invention. As shown in the figure, the electro-optical device 10 according to the first embodiment includes a display panel 100, an image signal processing circuit 52, a scan control circuit 54, and inverter circuits 56. Among these, the scan control circuit 54 controls each of the image signal processing circuit 52, a scanning line driving circuit 130, and a data line driving circuit 140 in accordance with a, vertical scanning signal Vs, a horizontal scanning signal Hs, and a dot clock signal Dclk which are supplied from a higher-level device (not shown).

The image signal processing circuit 52 converts digital image data Vd into data signals Vid1, Vid2, and Vid3 of three analog channels under the control of the scan control circuit 54 and outputs the data signals Vid1, Vid2, and Vid3 to three image signal lines 146. Here, the image data Vd designates gray scale levels (luminance) of the pixels as digital values, and data corresponding to the pixels of the display panel 100 is supplied in synchronization with the vertical scanning signal Vs, the horizontal scanning signal Hs, and the dot clock signal Dclk (that is, in accordance with vertical scanning and horizontal scanning).

Here, the reason for converting the image data Vd into the three channel data signals in the embodiment is for extending a period, in which data for one pixel of the image data Vd is supplied, three times along the time axis (also, referred to as a phase development or serial-to-parallel conversion) and ensuring sufficient sampling time for the data signal that is sampled by TFTs 144 to be described later.

In addition, the image signal processing circuit 52 converts the image data Vd corresponding to a pixel into one among the data signals Vid1, Vid2, and Vid3 having a voltage level in accordance with a gray scale level of the pixel. In this conversion process, the image data is alternately converted into a positive voltage level that is higher than a reference voltage Vc, to be described later, by a value corresponding to the gray scale level of the pixel and a negative voltage level that is lower than the reference voltage Vc by a value corresponding to the gray scale level of the pixel.

The reason for polarity inversion of the voltages Is for preventing degradation of the liquid crystal due to application of a DC component. While there are various types of polarity inversion of the data signals for the pixels such as the polarity inverted on a scanning line basis, the polarity inverted on a data line basis, the polarity inverted on a pixel basis, and the polarity inverted on a face (frame) basis, in this embodiment, for the convenience of description, description will be made in relation to a case where the polarity is inverted on a scanning line basis. However, this exemplary description is not intended to limit the present invention thereto.

In the embodiment, although the polarities of the data signals are described with respect to the voltage level Vc, however, a ground potential Gnd corresponding to logic level L, to be described later, is used as a reference voltage of zero volts for describing a voltage unless mentioned otherwise.

The inverter circuits 56 are provided for each channel. The inverter circuits 56 invert data signals supplied to the image signal lines 146 with respect to the voltage Vc and supply the inverted data signals /Vid1, /Vid2, and /Vid3 to three inverted image signal lines 156. Here, "/" denotes inversion.

The image signal processing circuit 52, the scan control circuit 54, and the inverter circuits 56 are formed as a module and are connected to the display panel 100, for example, through an FPC (flexible printed circuit) substrate.

The display panel 100 performs a predetermined display operation using the liquid crystal. The display panel 100 is of the peripheral circuit built-in type in which the scanning line driving circuit 130, the data line driving circuit 140, and a capacitor circuit 150 are disposed around a display area 100*a*.

In the display area 100*a*, the pixels 110 are disposed. In the display area 100*a* according to the embodiment, there are provided 1080 scanning lines 112 in a horizontal direction (X direction) and 1920 (=640×3) data lines 114 in a vertical direction (Y direction). In addition pixels 110 are provided in correspondence with intersections of the scanning lines 112 and the data lines 114. Accordingly, in the embodiment, the pixels 110 are disposed in the shape of a matrix having vertical 1080 rows×horizontal 1920 columns in the display area 100*a*, but the present invention is not limited thereto.

The scanning mine driving circuit 130 supplies scanning signals G1, G2, G3, ..., G1080 to the 1st, 2nd, 3rd, ..., 1080th scanning lines 112 over a vertical scam-ling period (frame) under the control of the scan control circuit 54. In particular, the scanning line driving circuit 130 sequentially selects the 1st, 2nd, and the 3rd to 1080th scanning lines 112 from the top in FIG. 1, the scanning signal for the selected scanning line is set to level H corresponding to a voltage level Vdd, and the scanning signals for the scanning lines other than the selected scanning line are set to level L corresponding to a non-selection voltage (ground potential Gnd).

Figure 3:
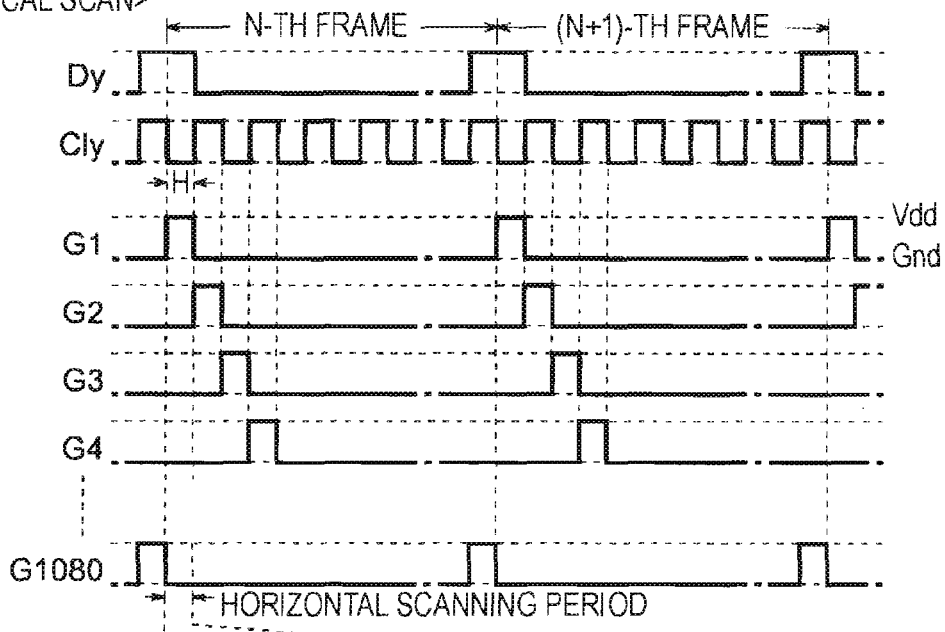
FIG. 3 is a timing chart showing a display operation of the electro-optical device.
Figure 3:
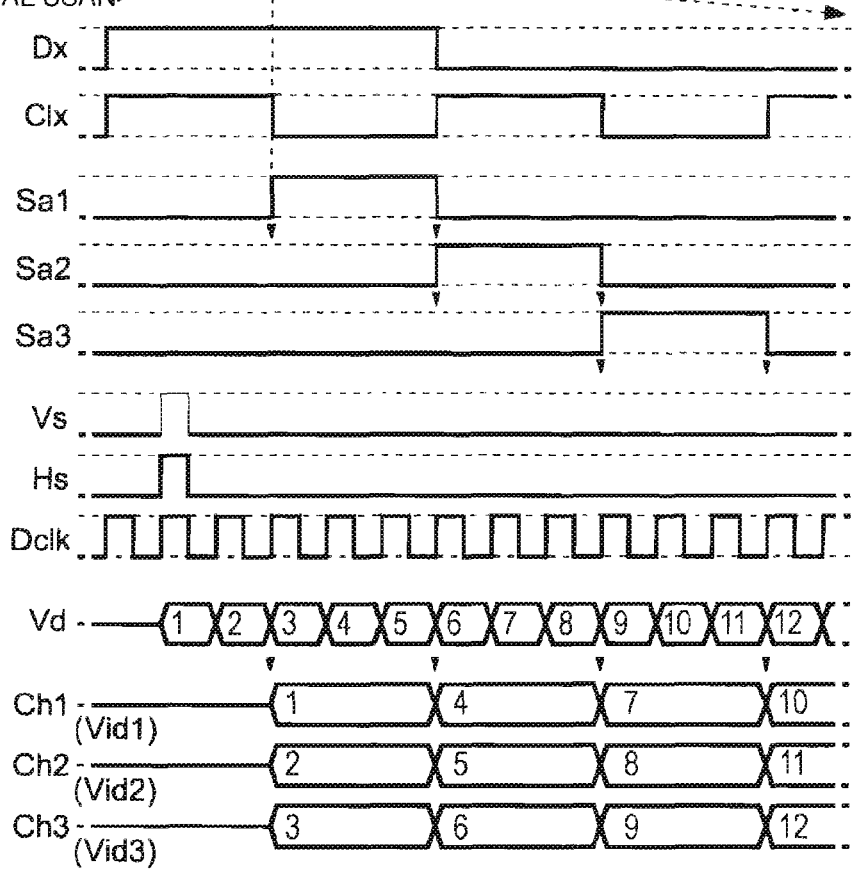

Since the structure of the scanning line driving circuit 130 is not directly related to the present invention, a description thereof is omitted here. The scanning line driving circuit 130, as shown in FIG. 3, sequentially shifts start pulses Dy, which are supplied from the scan control circuit 54, each time when the start pulses Dy transit (rises up or falls down) at a level of a clock signal Cly and performs a wave-shaping operation or the like for the shifted start pulses, whereby the scanning signals G1, G2, G3, ..., 1080 are sequentially set to level H in that order.

The data line driving circuit 140 includes a first sampling signal output circuit 142 and n-channel type thin-film transistors (hereinafter, referred to as TFTs) 144 that are provided in correspondence with the data lines 114.

Here, the 1st to 1920th data lines 114 are grouped into blocks for each three data lines in the embodiment. Since the total number of the data lines 114 is "1920", the number of blocks is "640".

Figure 4:
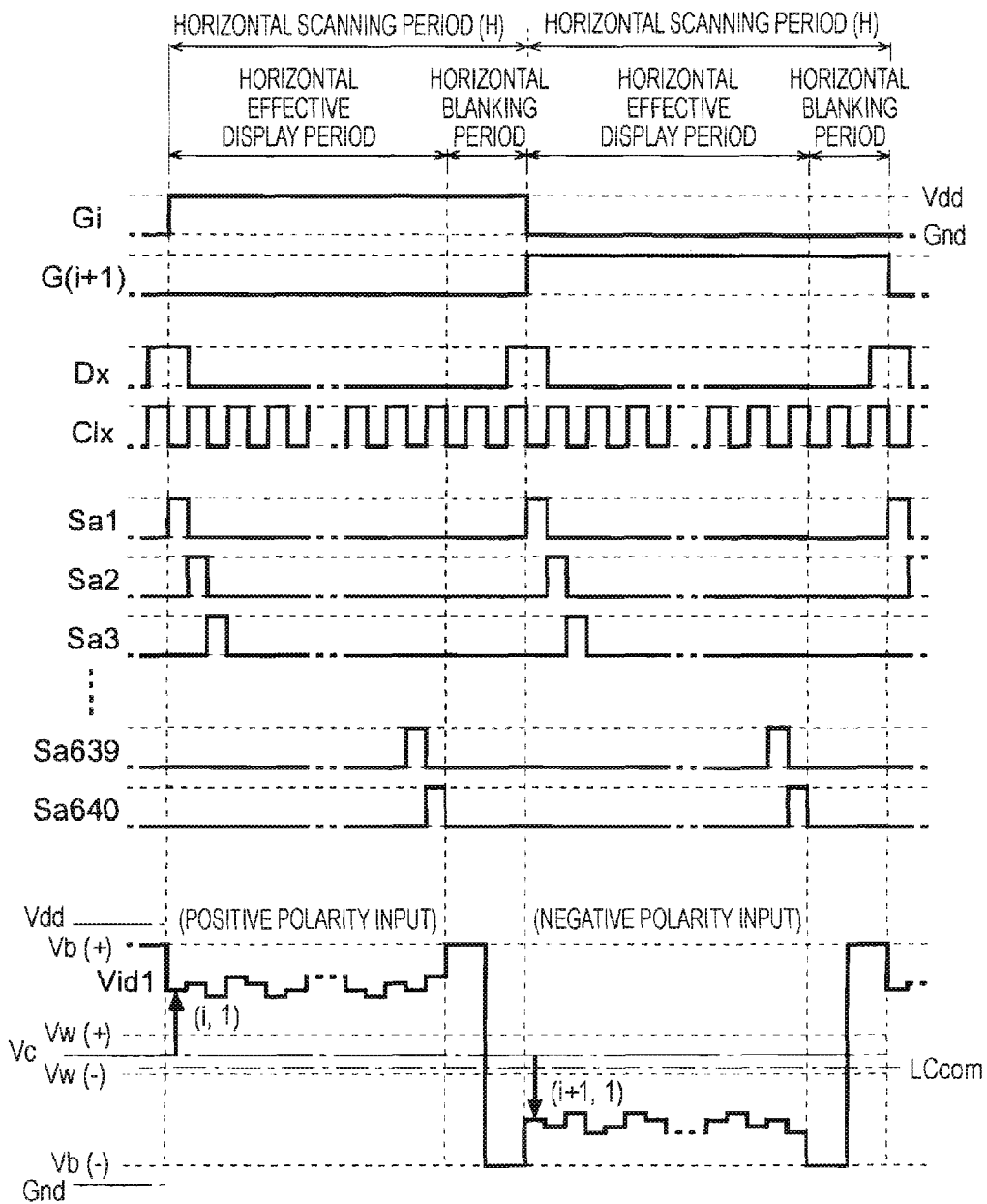
FIG. 4 is a timing chart showing a display operation of the electro-optical device.

The first sampling signal output circuit 142 sequentially outputs sampling signals Sa1, Sa2, and Sa3 to Sa640 in correspondence with each block under the control of the scan control circuit 54. In particular, the first sampling signal output circuit 142, as shown in FIG. 3 or 4, sequentially shifts a start pulse Dx, which is firstly supplied during a horizontal scanning period, each time the start pulse Dx transits at a level of a clock signal Clx and performs a wave-shaping operation or the like for the shifted start pulse, whereby the sampling signals Sa1, Sa2, Sa3, . . . , Sa640 are sequentially set to level H in that order.

First ends of the 1st to 1920th data lines 114 are connected to drain electrodes of the TFTs 144 (first transistors) serving as sampling switches, and gate electrodes of the TFTs 144 belonging to a same block are commonly connected to each other. To the commonly connected gate electrodes of the TFTs 144 belonging to the same block, a sampling signal output from the first sampling signal output circuit 142 is supplied in correspondence with the block. For example, since the 2nd block from the left corresponds to the 4th, 5th, and 6th data lines 114, the sampling signal Sa2 is commonly supplied to the gate electrodes of the TFTs 144 corresponding to these data lines 11.4.

Source electrodes of the TFTs 144 are connected to one among three image signal lines 146 that satisfies the following connection condition. Hereinafter, j is an integer satisfying the condition $1 \leq j \leq 1920$ for generalized description of the data lines 114. The source electrode of the TFT 144 having the drain electrode connected to one end of the j-th data line 114 from the left side in FIG. 1 is connected to the image signal line 146 to which the data signal Vid1 is supplied when the remainder resulting from dividing the column number j by three is "1". On the other hand, the source electrode of the TFT 144 having the drain electrode connected to the j-th data line from the left side is connected to the image signal lines 146 to which the data signals Vid2 and Vid3 are supplied, when the remainder resulting from dividing j by three is "2" and "0", respectively. For example, the source electrode of the TFT 144 having the drain electrode connected to the 8-th data line 114 from the left side is connected to the image signal line 146 to which the data signal Vid2 is supplied since the remainder resulting from dividing "8" by three is "2".

The capacitor circuit 150 is an aggregate of n-channel-type TFTs 154 that are provided in correspondence with the data lines 114. The other ends of the 1st to 1920th data lines 114 are connected to the source electrodes of TFTs 154 (second transistors). The drain electrodes of the TFTs 154 are connected to one among the three inverted image signal lines 156, in accordance with a same connection condition as the above-described connection between the source electrodes of the TFTs 144 and the image signal lines 146. In other words, the drain electrode of the TFT 154 having the source electrode connected to one end of the j-th data line 114 is connected to the inverted image signal line 156 to which the inverted data signals /Vid1, /Vid2, and /Vid3 are supplied, when the remainders resulting from dividing the column number j by three are "1", "2", and "0".

Here, since the gate electrodes of the TFTs 154 are commonly grounded to the electric potential Gnd corresponding to level L, the TFTs 154 are always in a turned off status in the embodiment.

Accordingly, the inverted image signal line 156 (corresponding to channel Ch1) to which the inverted data signal /Vid1 is supplied is connected to the 1st, 4th, 7th, . . . , 1918th data lines through parasitic capacitance between the source and drain electrodes of the TFTs 154. Similarly, the inverted image signal line 156 (corresponding to channel Ch2) to which the inverted data signal /Vid2 is supplied is connected to the 2nd, 5th, 8th, . . . , $1919^{th}$ data lines through parasitic capacitance between the source and drain electrodes of the TFTs 154. In addition, the inverted image signal line 156 (corresponding to a channel Ch3) to which the inverted data signal /Vid3 is supplied is connected to the 3rd, 6th, . . . , 1920th data lines through parasitic capacitance between the source and drain electrodes of the TFTs 154.

The size of each TFT 154 is formed to be the same as that of each TFT 144. Accordingly, the parasitic capacitance between the source and drain electrodes of each TFT 154 is almost the same as that of each TFT 144.

In the embodiment, although the TFTs 144 and 154 are of the n-channel type, p-channel type or combined type in which the p-channel and n-channel types are combined may be used for the TFTs 144 and 154.

Figure 2:
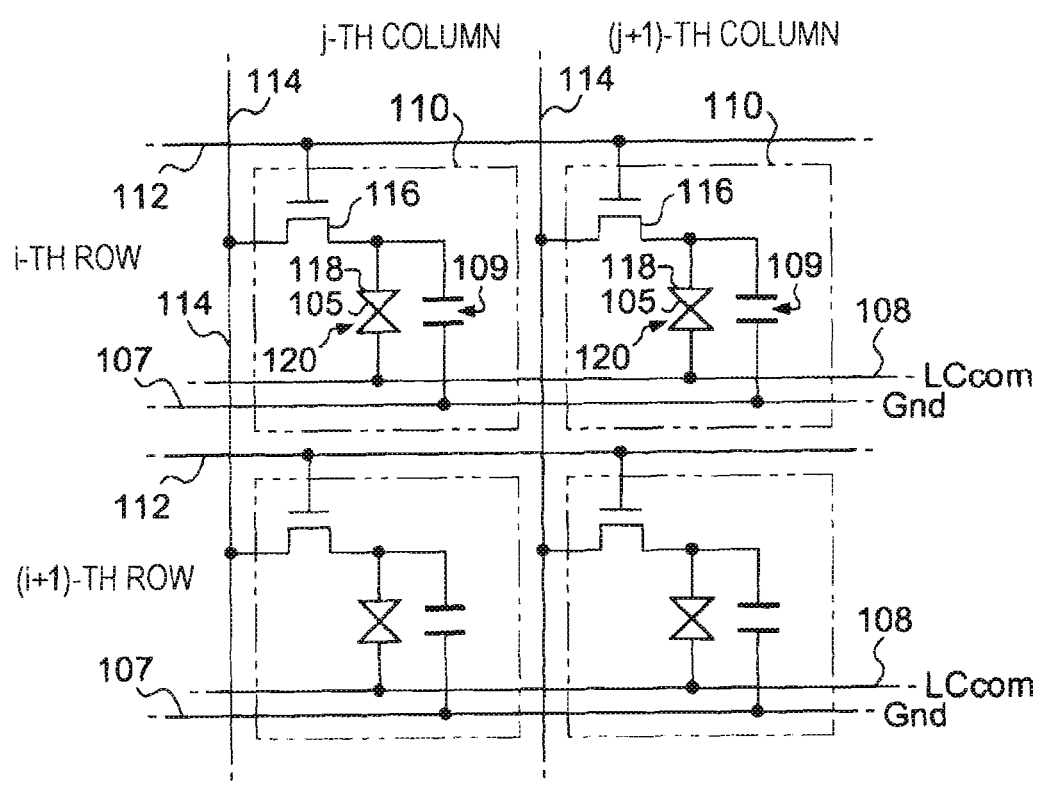
FIG. 2 is a diagram showing the structure of pixels of the electro-optical device.

Next, the pixels 110 will be described. FIG. 2 shows the structure of the pixels 110. In the figure, there are shown the structures of four pixels 2×2 corresponding to the intersections of the i-th row and the (i−1)-th row adjacent and downward thereof and the j-th column and the (j+1)-th column adjacent and to the right thereof. Here, and (i+1) are signs used for generally denoting the rows at which the pixels 110 are disposed, and i is an integer satisfying the condition $1 \leq i \leq 1080$ in the embodiment.

As shown in the figure, each pixel 110 includes an n-channel-type TFT 116, a liquid crystal capacitor 120, and a storage capacitor 109. Since the pixels 110 have the same structure, a pixel disposed in the i-th row and j-th column will be described, representatively. In the pixel 110 in the i-th row and j-th column, a gate electrode of the TFT 116 is connected to the j-th scanning line 112, a source electrode of the TFT 116 is connected to the j-th data line 114, and a drain electrode of the TFT 116 is connected to the pixel electrode 118.

Here, opposing electrodes 108 are provided commonly for all the pixels so as to oppose the pixel electrode 118 and are maintained at a constant voltage level LCcom. A liquid crystal 105 is pinched between the pixel electrode 118 and the opposing electrode 108. Accordingly, the liquid crystal capacitor 120 including the pixel electrode 118, the opposing electrode 108, and the liquid crystal 105 is formed for each pixel.

As shown in FIG. 4, the voltage level LCcom is set slightly lower than the voltage level Vc that is a reference for the polarity. The voltage level LCcom is set as described above, since a, phenomenon occurs (referred to as pushdown, passing-through, field-through, or the like) in which the electric potential of the drain electrode (pixel electrode 118) of the TFT 116 in the pixel 110 is lowered due to parasitic capacitance between the gate and drain electrodes at a time when the TFT 116 is turned on from a turned-off status. In order to prevent degradation of the liquid crystal, the liquid capacitor 120 should be driven by an alternating current. However, when the voltage level LCcom of the opposing electrode 108 is set as a reference for input polarity, the rms value of the voltage of the liquid crystal capacitor 120 for a negative input becomes slightly greater than that for positive input (in a case where the TFT 116 is an n-channel type for the pushdown, whereby a DC component is applied to the liquid crystal capacitor 120. In order to prevent the application of the DC current to the liquid capacitor 120, the voltage level LCcom of the opposing electrode 108 is set lower than the reference voltage level Vc of the input polarity so as to offset the effect of the pushdown.

Although not specifically shown in the figure, on the opposing surfaces of the two substrates, oriented films, which have been rubbed so that the liquid crystal molecules twist about their longitudinal axes by approximately 90 degrees between the substrates, are provided, and on the outer surfaces thereof, polarizers in accordance with the orientation directions are provided.

Light passing between the pixel electrode 118 and the opposing electrode 108 is rotary-polarized by approximately 90 degrees in accordance with a twist of the liquid crystal molecules if the rms value of the voltage applied to the liquid crystal 105 is zero. As the rms value of voltage increases, the liquid crystal molecules tilt toward the direction of the electric field, and the rotary polarization is lost. Thus, for example, in the transmission type, when polarizers with orthogonal polarization axes are provided in accordance with the orientations on the incident side and the rear side, if the rms value of the voltage applied to the substrate is zero, a white color is displayed, wherein the transmissivity becomes maximum. As the rms value of the voltage applied to the substrate increases, the transmitted light decreases and finally a black color is displayed, wherein the transmissivity becomes minimum (in the case of the normally white mode).

In order to decrease the effect of leakage through the TFT 116 from the liquid capacitor 120, storage capacitors 109 are formed for each pixel. First ends of the storage capacitors 109 are respectively connected to the pixel electrodes 118 (the drain electrodes of the TFT 116), and second ends of the storage capacitors 109 are connected to a capacitor line 107 which is common to all the pixels for maintaining a constant electric potential level (for example, a ground potential Gnd).

Next, the operation of the electro-optical device 10 will be described.

The image data VD, as shown in FIG. 3, corresponding to a pixel of the 1st row and the 1st column is supplied when the vertical scanning signal Vs and the horizontal scanning signal Hs (pulse) are output. Thereafter, the image data Vd for the other pixels is sequentially supplied in synchronization with the dot clock signal Dclk. When the image data Vd corresponding to the $1920^{th}$ column is supplied, the horizontal scanning signal Hs is output again, the image data Vd corresponding to the pixels in the 1st to $1920^{th}$ columns and the next row is supplied similarly. When the image data Vd corresponding to the pixel of the $1080^{th}$ row and $1920^{th}$ column, which is the final row and the final column, is supplied, the process proceeds to the next frame, and the vertical scanning signal Vs and the horizontal scanning signal Hs are output again, whereby the image data Vd for the next frame is sequentially supplied, starting from the image data for the pixel of the 1st row and 1st column.

For each row of the image data Vd, which is supplied as described above, the scan control circuit 54 controls the scanning signal processing circuit 52, the scanning line driving circuit 130, and the data line driving circuit 140 as follows. The scan control circuit 54 controls the image signal processing circuit 52 such that the image data corresponding to the pixels in the 1st, 4th, 7th, 10th, . . . , 1918th columns are distributed to channel Ch1, the image data corresponding to the pixels in the 2nd, 5th, 8th, 11th, . . . , 1919th columns are distributed to channel Ch2, and the image data corresponding to the pixels in the 3rd, 6th, 9th, 12th, . . . , 1920th columns are distributed to a channel Ch3. In additions the scan control circuit 54 controls the scanning line driving circuit 130 such that the scanning signal corresponding to the supplied row of the image data Vd becomes of level H. In addition, the scan control circuit 54 controls the first sampling signal output circuits 142 such that the sampling signal Sa1 becomes of level H in a period when the image data Vd corresponding to the pixels in the 1st to 3rd rows is distributed to the channels Ch1 to Ch3, the sampling signal Sa2 becomes of level H in a period when the image data Vd corresponding to the pixels in the 4th to 6th rows is distributed to the channels Ch1 to Ch3, and the next sampling signals become level H similarly. Accordingly, the scan control circuit 54 controls the first sampling signal output circuits 142 such that the sampling signal Sa640 becomes of level H for a period when the image data Vd corresponding to the pixels in the 1918th to 1920th rows is distributed to the channels Ch1 to Ch3.

In the embodiment, as described above, it is assumed that the input polarities are inverted on a scanning line basis and a positive input is designated for the 1st line of a frame (hereinafter, referred to as n-th frame).

First, when the scanning signal G1 becomes of level H, the pixels 110 located in the 1st row, that is, the TFTs 116 in the 1st row and 1st column to the 1st row and 1920th columns are turned on. In a period when the scanning signal G1 becomes of level H, at first, the sampling signal Sa1 becomes of level H. In a period when the sampling signal Sa1 becomes of level H, the data signals Vid1, Vid2, and Vid3 supplied to three image signal lines 146 have voltage levels that are converted into levels higher than the voltage level Vc by values corresponding to the gray scale levels of the pixels in the 1st row and 1st column, the 1st row and 2nd column, and the 1st column and the 3rd row. Since the sampling signal Sa1 has level H, the TFTs 144 in the 1st, 2nd, and 3rd columns belonging to the 1st block are turned on. Accordingly, the data signals Vid1, Vid2, and Vid3 supplied to the image signal lines 146 are respectively sampled to the 1st, 2nd, and the 3rd data lines 114, and accordingly, positive voltages in accordance with gray scale levels of the data signals are applied to the pixel electrodes 113 in the 1st row and 1st column, the 1st row and 2nd column, and the 1st row and the 3rd column through the TFTs 116 that are turned on.

Next, in a horizontal scanning period when the scanning signal G1 becomes of level H, the sampling signal Sa2 becomes of level H. In the period when the sampling signal Sa2 becomes of level H, the data signals Vid1, Vid2, and Vid3 supplied to the image signal lines 146 have positive voltage levels corresponding to the gray scale levels of the pixels in the 1st row and 4th column, the 1st row and 5th column, and the 1st column and the 6th row. Since the sampling signal Sa2 has level H, the TFTs 144 in the 4th, 5th, and 6th columns belonging to the 2nd block are turned on. Accordingly, the data signals Vid1, Vid2, and Vid3 supplied to the image signal lines 146 are respectively sampled to the data lines 114 in the 4th, 5th, and 6th row. Accordingly, positive voltage levels corresponding to the gray scale levels of the data signals are applied to the pixel electrodes 118 in the 1st row and 4th column, the 1st row and 5th column, and the 1st row and 6th column through the TFTs 116 that are turned on.

Thereafter, similarly, when sampling signals Sa3, Sa4, . . . , a640 sequentially become level H, the data signals Vid1 to Vid3 are respectively sampled to the 3rd data lines 114 belonging to the 3rd, 4th, . . . , 640th blocks, and accordingly, positive voltage levels corresponding to the gray scale levels of the data signals are applied to the pixels in the 1st to 1920th columns located in the 1st row.

Next, the horizontal scanning period when the scanning signal G2 becomes of level H for the n-th frame will be described. In the embodiment, as described above, since the input polarities are inverted on a scanning line basis, a negative input is designated for the pixels in the 2nd row.

When the scanning signal G2 becomes of level H, the pixels 110 located in the 2nd row, that is, the TFTs 116 in the 2nd row and 1st column to the 2nd row and 1920th column are turned on.

In the horizontal scanning period when the scanning signal G2 becomes of level H, the data signals Vid1, Vid2, and Vid3, supplied to the image signal lines 146 in the period when the sampling signal Sa1 become level H, become negative voltage levels corresponding to the gray scale levels of the pixels in the 2nd row and 1st column, the 2nd row and 2nd column and the 2nd row and 3rd columns. Accordingly, negative voltage levels corresponding to the gray scale levels are applied to the pixel electrodes 118 in the 2nd row and 1st column, the 2nd row and 2nd column and the 2nd row and the 3rd column through the TFTs 116 that are turned on.

Other operations are the same as in the horizontal scanning period when the scanning signal G1 is of level H, and when the sampling signals Sa2, Sa3, Sa4, . . . , Sa640 sequentially become level H, the data signals Vid1 to Vid3 are sampled in that order to the 3rd data line 114 belonging to the 2nd, 3rd, 4th, . . . , 640th blocks. Accordingly, negative voltage levels corresponding to the gray scale values of the pixels are applied to the pixels in the 1st to 1920th columns located in the 2nd row.

For the n-th frame, while positive voltage levels corresponding to the gray scale levels are applied to the pixels in the 3rd, 5th, 7th, . . . , 1079th rows that are odd rows, negative voltage levels corresponding to the gray scale levels are applied to the pixels in the 4th, 6th, 8th, . . . , 1080th rows that are even rows.

In the next (n+1)-th frame, the same input polarities are used, but the input polarity for each row may be changed. In other words, in the next (n+1)-th frame, while negative voltage levels are applied to the pixels in odd rows, positive voltage levels are applied to the pixels in even rows.

FIG. 4 is a diagram showing a voltage waveform of the data signal Vid1 in a period when a scanning line in an odd i-th row is selected and a successive period when an even (i+1)-th row is selected, as an example. In FIG. 4, the vertical scale representing the voltage level of the data signal Vid1 is enlarged, compared with the vertical scales for other signals, for the convenience of description.

As shown in the figure, in the n-th frame in which a positive input is designated to an odd i-th row, for example, in a period when the sampling signal Sa1 becomes of level H within a horizontal scanning period when a scanning signal Gi becomes of level H, the data signal Vid1 has a voltage level (in the figure, denoted as a symbol ↑) higher than the voltage level Vc by a value corresponding to a gray scale level of a pixel in the i-th row and 1st column, and then changes to have positive voltage levels corresponding to gray scale levels of the pixels in the 4th, 7th, 10th, . . . , 1918th columns in accordance with change of the sampling signal.

Since a negative input is designated for the even (i+1)-th row by inverting the input polarity, for example, in a period when the sampling signal Sa1 becomes of level H within a horizontal scanning period when a scanning signal G(i+1) becomes of level H, the data signal Vid1 has a voltage level (in the figure, denoted as a symbol ↓) lower than the voltage level Vc by a value corresponding to the gray scale level of a pixel in the i-th row and 1st column and then, changes to have positive voltage levels corresponding to the gray scale levels of the pixels in the 4th, 7th, 10th, . . . , 1918th columns in accordance with change of the sampling signal.

Next, the relationship between voltages shown in FIG. 4 will be described. Voltages Vb(−) and Vw(−) have negative voltage levels that respectively activate corresponding pixels to display a black color that corresponds to a minimal gray scale level and a white color that corresponds to a maximal gray scale level, when they are applied to the pixel electrodes 118. On the other hand, voltages Vb(+) and Vw(+) have positive voltage levels that respectively activate corresponding pixels to display a black color that corresponds to a minimal gray scale level and a white color that corresponds to a maximal gray scale level, when they are applied to the pixel electrodes 18. The voltages Vb(+) and Vw(+) and the voltages Vb(−), Vw(−) are symmetrical with respect to the voltage level Vc.

In the figure, the data signal Vid1 has a voltage level corresponding to the black color over a horizontal blanking period that is from a time when the sampling signal Sa640 changes to level L to a time when the sampling signal Sa1 changes. The reason is for preventing the data signal Vid1 from influencing the display even in a case where the data signal Vid1 is incorrectly input to a pixel due to timing discrepancy or the like.

In the embodiment, although the period when the data signal is sampled to the data line 114 is only for a period when a sampling signal for a block to which the data line belongs has level H, the period when the TFT 16 is turned on is the horizontal scanning period, that is much longer than the sampling period, including the sampling period. Accordingly, even after the data signal is sampled to the corresponding data line, the TFT 116 continues to be turned on.

In a horizontal scanning period when the scanning signal corresponding to one row (i-th row) is of level I-H, data signals having positive voltage levels corresponding to gray scale levels of the pixels are sequentially supplied to the image signal lines 146 as the sampling signals Sa1, Sa2, Sa3, . . . , Sa640 sequentially become level H. Accordingly, for example, the data signal Vid1 for the channel Ch1, as shown in FIG. 4, changes its voltage level in the horizontal scanning period when the scanning signal Gi is of level H, when the gray scale level of the pixel in the i-th row changes.

Here, when the sampling of data signals for the j-th data line 114 is completed, the TFTs 144 in the j-th column are turned off, but change of the voltage levels of the data signals supplied to the image signal line 146 are transmitted to the j-th data line 114 through parasitic capacitance between the source and drain electrodes of the TFTs 144. Accordingly, in the structure in which the TFTs 154 are not provided, the j-th data line 114 changes its voltage level from the voltage level of the sampled data signal. At this moment, since the scanning signal Gi has level H, the TFT 116 in the i-th row and j-th column is turned on. Accordingly, when the voltage level of the j-th data signal changes, the voltage level input to the liquid capacitor 120 in the i-th row and j-th column changes from the voltage level (sampled voltage level) corresponding to the gray scale level of the pixel in the i-th row and j-th column, whereby causing horizontal crosstalk.

Figure 5:
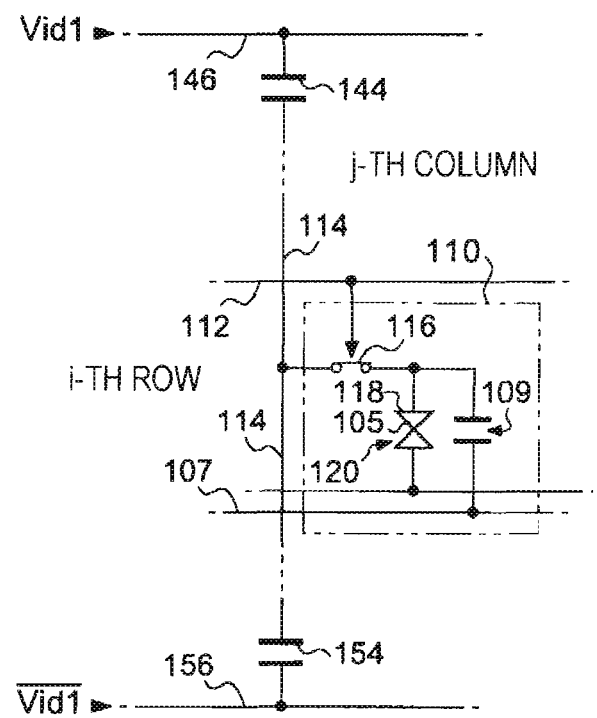
FIG. 5 is an equivalent circuit for one row of a display panel of the electro-optical device.

In the embodiment, an equivalent circuit for a part around the j-th data line 114 after sampling of the data signal to the j-th data line in the horizontal scanning period when the scanning signal Gi is of level H is as shown in FIG. 5. To be more specific after sampling of the data signal to the j-th data line 114 is completed, the TFT 144 in the i-th row and the j-th column is turned off. Accordingly, although the data signal (voltage level change of the data signal) is transmitted to j-th data line 114 through the parasitic capacitance between the source and drain electrodes of the TFT 144, in the embodiment, an inverted data signal for the data signal is supplied to the inverted image signal line 156, and the inverted image signal line 156 is connected to the j-th data line 114 through the TFT 154 that is turned off. Thus, voltage changes due to the data signals in each data line are offset by the voltage changes of the inverted data signals, whereby the voltage changes in the data lines after sampling are suppressed. Accordingly, in the embodiment, it is possible to prevent degradation of display quality due to the horizontal crosstalk.

Figure 6:
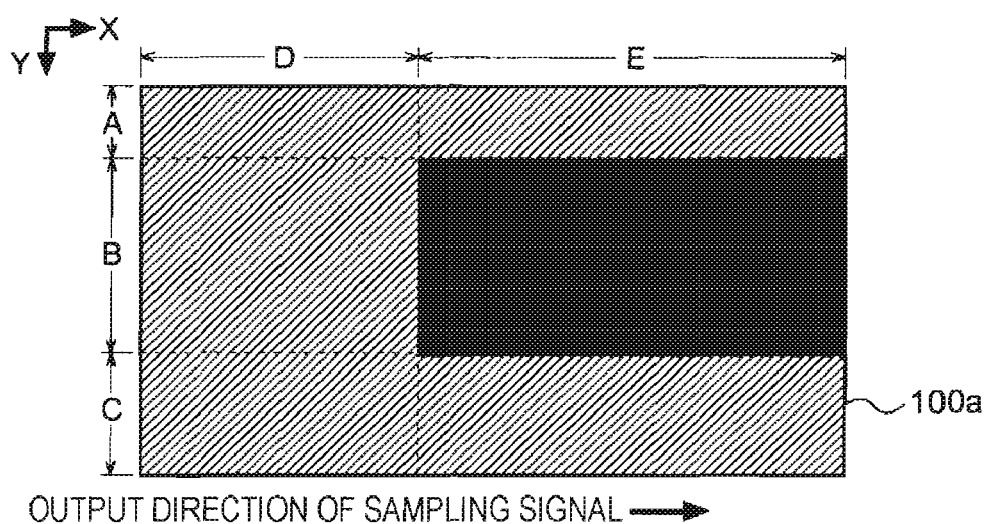
FIG. 6 is an example of display in the electro-optical device.

The degradation of the display quality will be described with reference to an example. FIG. 6 is a display example in which the degradation of the display quality due to the horizontal crosstalk can easily occur. The degradation of the display image due to the horizontal cross talk can easily occur when a rectangular black area is displayed on the right side of a screen over a gray color (middle gray scale level) background.

In the figure, sections A, B, and C are used for dividing rows of pixels. Among these, the sections A and C represent areas in the rows in which the pixels include gray areas only, and the section B represents the area in the rows in which the pixels include a gray area and a black area. Sections D and E are used for dividing columns of the pixels. The section D represents an area in the columns in which the pixels include a gray area only, and the section E represents the area in the rows in which the pixels include both a gray area and a black area.

Here, in a horizontal scanning period when scanning lines belonging to the sections A and C are selected, the data signals have a constant voltage level corresponding to the gray color. Thus, voltage change caused by data signals after sampling of the data signals does not take effect on the data lines belonging to the section D. Accordingly, voltage levels corresponding to the gray color are correctly applied to the liquid crystal capacitors 120 disposed in areas defined by the sections A×D, A×E, C×D, and C×E.

On the other hand, in a horizontal scanning, period when scanning lines belonging to the section B are selected, the voltage levels of the data signals change from a value corresponding to the gray color to a value corresponding to the black color. Thus, voltage changes caused by data signals after sampling of the data signals take effect on the data lines belonging to the section D. Accordingly, the voltage levels change in a direction for increasing the voltage levels in a case where a positive input level is designated and change in a direction for decreasing the voltage levels in a case where a negative input level is designated. In any case, the voltage levels change in a direction for darkening the pixels in a normally-white mode. Accordingly, the voltage levels changed from voltage levels corresponding to a correct gray color to voltage levels corresponding to a slightly darker gray scale level are applied to the liquid crystal capacitors 120 disposed in an area defined by the section B×D.

While the pixels disposed in the areas defined by the sections A×D, A×E, C×D, and C×E and the pixels disposed in the area defined by the sections B×D should be displayed in the same gray color, the pixels disposed in the area defined by the sections B×D are displayed slightly darker than the areas defined by the sections A×D, A×E, C×D, and C×E, which is recognized as degradation of the display quality. Since the degradation of the display quality appears in a horizontal direction of the screen with respect to a specific area (here, a black area of the section B×E), it is referred to as horizontal crosstalk.

Figure 7:
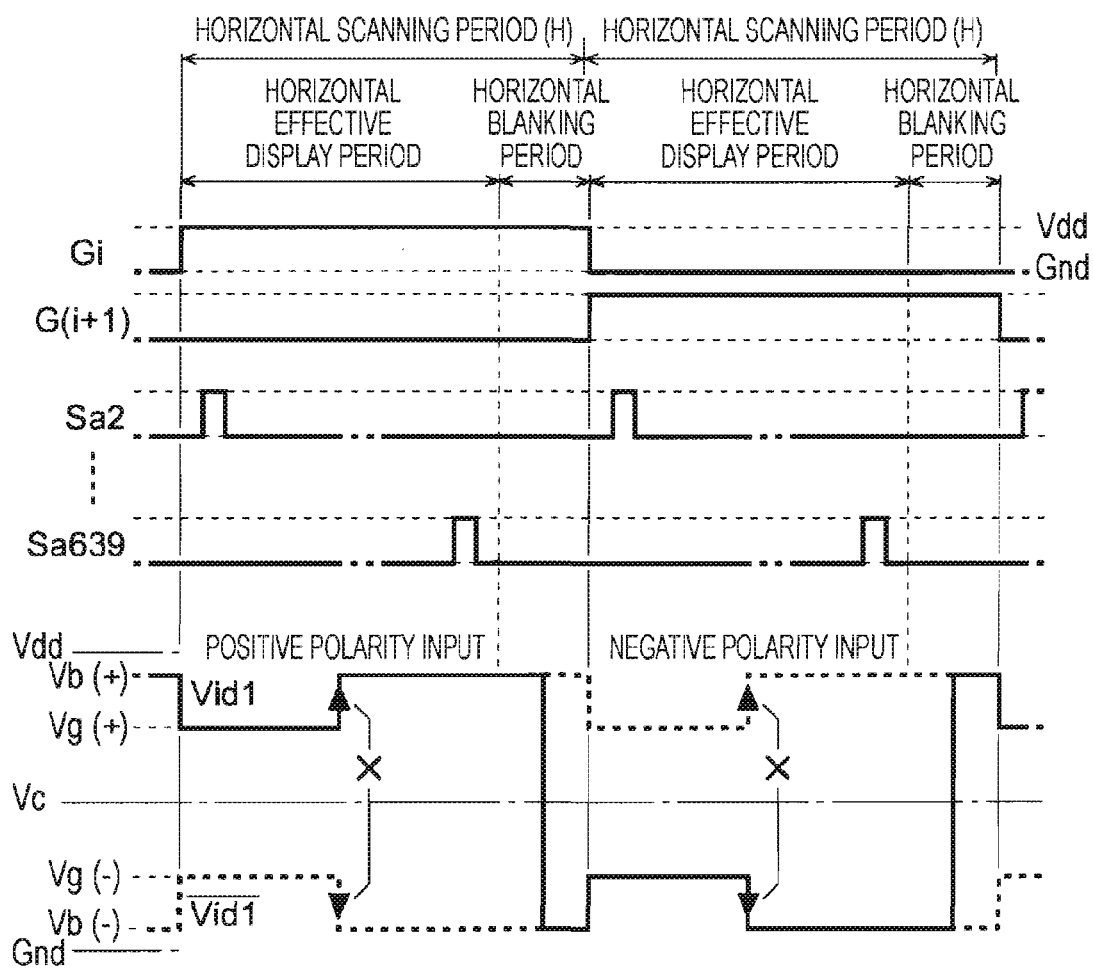
FIG. 7 is a diagram showing suppression of crosstalk in the electro-optical device.

However, in the embodiment, in the horizontal scanning period when the scanning lines belonging to the section B are selected, for example, when the positive input level is designated, as show as a solid line in FIG. 7, while the data signal Vid1 increases from a positive voltage level Vg(+) corresponding to a gray color to a positive voltage level Vb(+) corresponding to a black color, the inverted data signal /Vid1, as shown as a dotted line in the figure, decreases from a negative voltage level Vg(−) corresponding to the gray color to a negative voltage level Vb(−) corresponding to the black color. Accordingly, in the data lines belonging to the section D, since the voltage changes due to the voltage change of the data signal is offset by the voltage changes due to the voltage changes of the inverted data signals, and thus, the sampled voltage levels do not change after sampling, whereby the degradation of display quality due to the horizontal crosstalk is suppressed.

On the other hand, when a negative input level is designated, the data signal Vid1, as shown in FIG. 7, decreases from a negative voltage level Vg(−) corresponding to the gray color to a negative voltage level Vb(−) corresponding to the black color, and the inverted data signal /Vid1 increases from a positive voltage level Vg(+) corresponding to the gray color to a positive voltage level Vb(+) corresponding to the black color.

Although FIG. 7 (FIG. 4) shows the data signal Vid1 for the channel Ch1 only, the data signals for the other channels Ch2 and Ch3 operates the same.

In the embodiment, although the input polarities for the pixels are shifted on a scanning line basis the input polarities may be shifted on a data line basis, a pixel basis, a face basis, or the like. Here, when the input polarities for the pixels are shifted on a data line basis or on a pixel basis, voltage changes of the data signals occur even in a case where gray scale levels of the pixels in one row are the same, but the effect of the voltage changes is offset by the inverted data signals.

In addition, in the embodiment, there is used a structure in which the TFT 154 in the turned off status is interposed between the inverted image signal line 156 and the data line 114, since it is easy to form a same parasitic capacitance as the parasitic capacitance between the drain and source electrodes of the TFT 144 that samples the data signal to the data line. Accordingly, for example, a capacitor of an electrode (wiring), an insulation layer, or an electrode (wiring) having capacitance almost the same as the parasitic capacitance between the source and drain electrodes of the TFT 144 may be electrically interposed between the inverted image signal line 156 and the data line 114.

The inverted data signals /Vid1, /Vid2, and /Vid3 are configured to be generated by inversion of the data signals Vid1, Vid2, and Vid3 with respect to the voltage level Vc in the embodiment. However, since the purpose of the inverted data signals are for changing the data signals in a direction opposite the direction of the voltage level changes of the data signals (and for supplying the changed voltage levels to the data lines 114 through capacitance), the reference for the inversion is not limited to the voltage level Vc.

Second Embodiment

Hereinafter, an electro-optical device according to a second embodiment of the invention will be described.

In the above-described first embodiment, there is used a structure in which the parasitic capacitance between the source and drain electrodes of the TFT is used without using a switching function of the transistor by grounding all the gate electrodes of the n channel type TFTs 154 to the electric potential Gnd corresponding to level L.

In the second embodiment, the TFT 154 is additionally used as a test circuit that tests whether a data signal is sampled to the data line 114 in a manufacturing process. The electro-optical device according to the second embodiment of the invention has two modes including a display mode for displaying on the display panel 100 and a test mode for a test for defective products after the manufacturing process.

Figure 8:
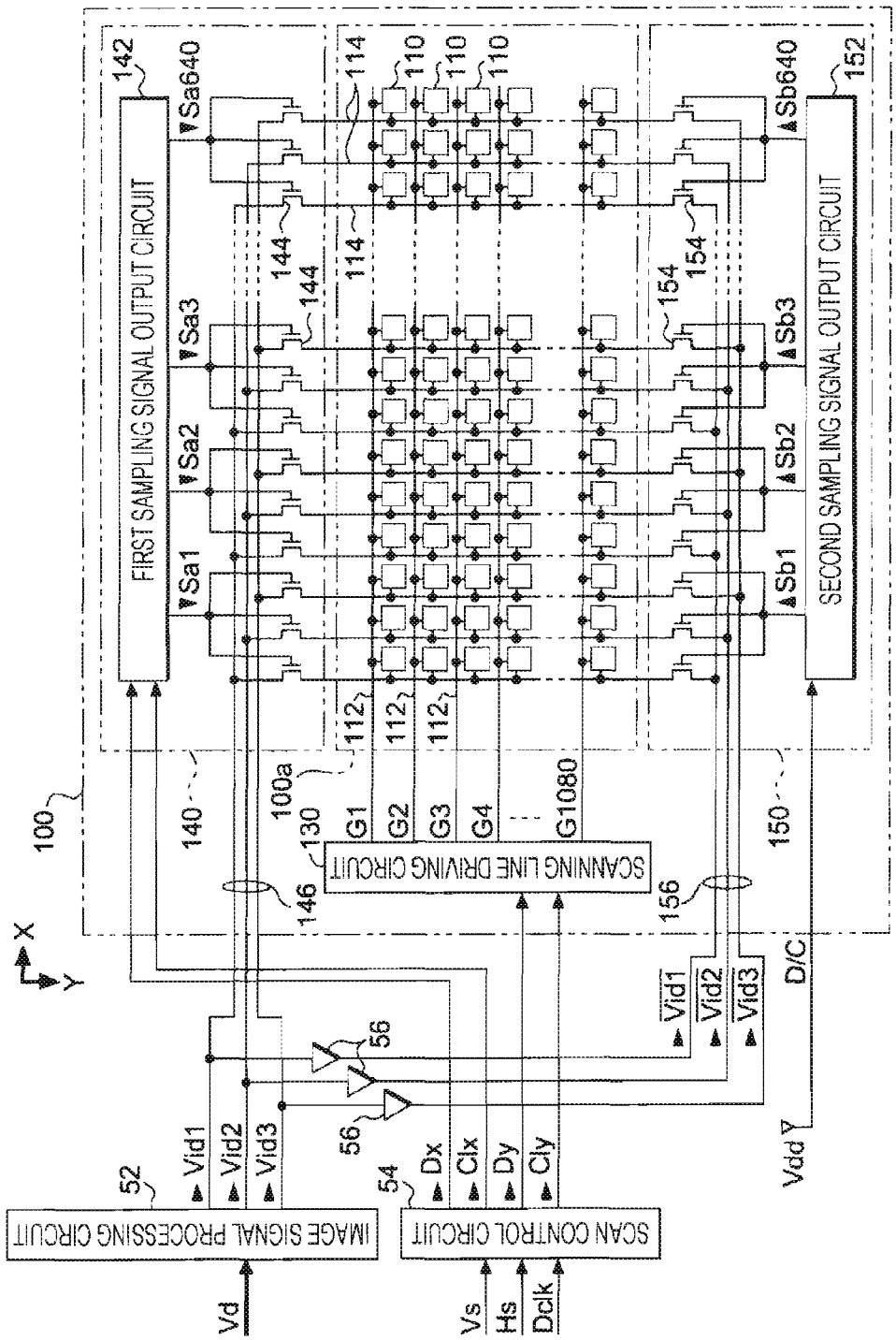
FIG. 8 is a block diagram showing a structure of an electro-optical device according to a second embodiment of the invention.
Figure 9:
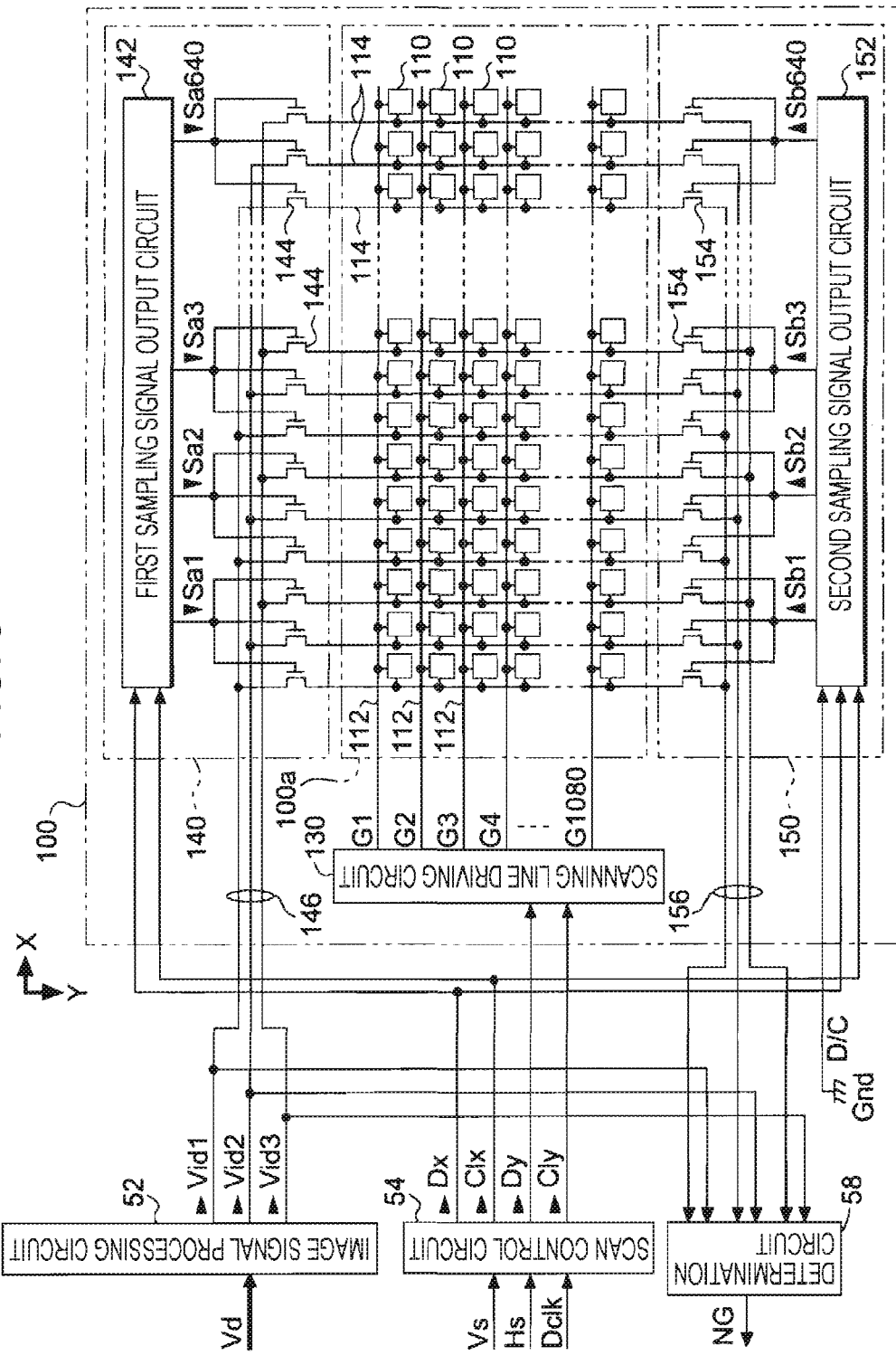
FIG. 9 is a block diagram showing the structure of the electro-optical device when used in a test mode.

FIG. 8 is a block diagram showing the structure of the electro-optical device when used in the display mode. FIG. 9 is a block diagram showing a structure of the electro-optical device when used in the test mode.

As shown in the figures, in the second embodiment, although the structure of the display panel 100 is the same in both modes, circuit modules connected to the display panel 100 are provided differently for each mode. Although there is no difference between the circuit modules in the first and second embodiments in the display mode (see FIG. 8), the circuit module in the second embodiment has an additional determination circuit 58 in place of the inverter circuit 56 for the test mode (see FIG. 9).

As shown in the figures, the capacitor circuit 150 of the display panel 100 has a second sampling signal output circuit 152 in addition to the TFTs 154 that are provided for each data line 114. In the test mode, the second sampling signal output circuit 152 outputs sampling signals Sb1, Sb2, Sb3, . . . , Sb640 in accordance with the blocks by sequentially shifting the start pulse Dx each time the level of the clock signal Clk transits or the like, similarly to the first sampling signal output circuit 142. Thus, in the test mode, the sampling signals Sa1, Sa2, Sa3, . . . , Sa640 and the sampling signals Sb1, Sb2, Sb3, . . . , Sb640 have the same waveforms.

In the display mode, the second sampling signal output circuit 152 sets all the sampling signals Sb1, Sb2, Sb3, . . . , Sb640 to level L.

The mode of the second sampling signal output circuit 152 is designated in accordance with a signal D/C. In particular, for example, the display mode is designated when the signal D/C is of level H (voltage level Vdd), and the test mode is designated when the signal D/C is of level L (ground to the electric potential Gnd).

Thus, in the display mode, as shown in FIG. 8, when the signal D/C is set to level H by the circuit module, all the sampling signals Sb1, Sb2, Sb3, . . . , Sb640 have level L, and accordingly, the same display operation as that of the first embodiment is performed.

On the other hand, in the test mode, as shown in FIG. 9, the signal D/C is set to level L by the circuit module. The determination circuit 58 determines the identity between the voltage level of the data signal output from the image signal processing circuit 52 to the image signal line 146 and the voltage level of a signal in the inverted image signal line 156 for each channel and determines the tested device to be a defective product in a case where the voltage levels are not identical to each other in any channel.

As described above, in the test mode, all the sampling signals Sa1, Sa2, Sa3, . . . , Sa640 and the sampling signals Sb1, Sb2, Sb3, . . . , Sb640 have the same waveforms. Thus, when each unit is normal, the data signal supplied to the image signal line 146 appears in the inverted image signal line 156 in the same channel through a path constituted by the turned-on TFT 144, the data line 114, and the turned-on TFT 154, and accordingly, the voltage level of the data signal in the image signal line 146 and the voltage level of the signal in the inverted image signal line 156 are the same.

When there is a defection such as disconnection in the path or destruction of component of the TFT 144 the voltage of the signal appearing in the inverted image signal, line 156 is not identical to the voltage of the data signal in the image signal line 146, whereby the tested device is determined to be defective.

In, the second embodiment, it can be considered that the operation in the test mode is performed at a time before enclosing the liquid crystals (right after the formation of a component substrate) or at a time when a checking operation is performed in a service center or the like.

Accordingly, in the second embodiment, it is possible to use the TFT 154, which is used in the test mode, in the display mode as it is in the turned-off status.

Although, in the above-described embodiment, there is used a structure in which three data lines 114 are grouped into one block and the data signals Vid1 to Vid3, which are distributed/converted into three channels, are sampled to the three data lines 114 belonging to one block, the number of distribution and the number of data lines to which signals are simultaneously applied (i.e., the number of the data lines constituting one block) is not limited to three. For example, if the response of the TFT 144 serving as a sampling switch is sufficiently quick, the image signal may be serially transmitted to one image signal line without converting it into parallel and sequentially sampled to each of the data lines 114. Furthermore, the number of converted images and the number of data lines to which signals are applied simultaneously may be other than "3", for example, "2" or may be equal to or greater than "4", for example, "6".

In any case, when there is used a structure in which the data signals are sampled plural times for each one or more data lines over a period for selecting one scanning line, voltage change of the data signal is transmitted to the corresponding data line through the capacitor between the source and drain electrodes of the TFTs 144 so as to change the electric potential of the data line, and accordingly, the present invention can be applied thereto.

Furthermore, the embodiment has been described in the context of the normally-white mode, in which a white color is displayed when the rms value of voltage difference between the opposing electrode 108 and the pixel electrode 118 is small, the normally black mode, in which a black color is displayed when the rms value of the voltage difference between the opposing electrode 108 and the pixel electrode 118 is small, may be employed.

In addition, although there is described in the embodiment a case where a transmissive-type is used, however, a reflective-type may be used instead. Furthermore, although TN type liquid crystal is used in the above-described embodiment, bi-stable type having a memory capability, such as BTN (Bistable Twisted Nematic) type and ferroelectric type, polymer dispersion type, and GH (Guest Host) type, in which a dye (guest), having anisotropy to absorption of visible light in the longitudinal axis direction and the lateral direction of the molecule, is dissolved into liquid crystal (host) having a regular molecular alignment so that the dye molecules and the liquid crystal molecules are arranged in parallel, may be used.

Furthermore, a vertical orientation (homeotropic orientation), in which the liquid crystal molecules are aligned vertically to the substrate when no voltage is applied, and the liquid crystal molecules are aligned horizontally to the substrates when a voltage is applied, may employed, or a parallel (horizontal) orientation (homogeneous orientation), in which the liquid crystal molecules are aligned horizontally to the substrates when no voltage is applied, and the liquid crystal molecules are aligned vertically to the substrates when a voltage is applied, may be employed. Thus, the present invention may be applied to various types of liquid crystals and various orientation methods.

Figure 10:
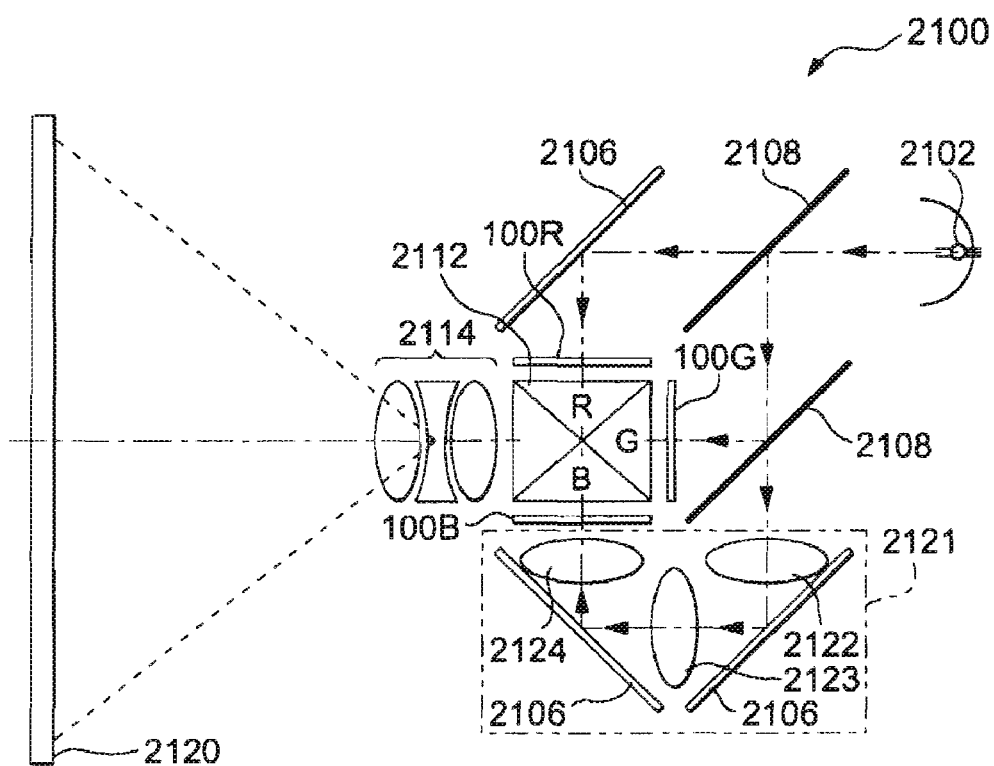
FIG. 10 is a diagram showing the structure of a projector in which an electro-optical device according to an embodiment of the invention is used.

Next, a projector that uses the display panel 100 of the above-described electro-optical device 10 as a light valve will be described, as an example of an electronic device using an electro-optical device according to the above-described embodiment. FIG. 10 is a plan view showing the configuration of the projector.

As shown in the figure, inside the projector 2100, there is provided a lamp unit 2102 including a white light source such as a halogen lamp. Light emitted from the lamp unit 2102 is divided into three primary colors of R (red), G (green), and B (blue) by thee mirrors 2106 and two dichroic mirrors 2108 which are disposed inside the projector 2100 and is guided to corresponding light valves 100R, 100G, and 100B. Since the B color light has a light path longer than those of the R and G color light, the B color light is guided through a replay lens system 2121 including an incident lens 2122, a relay lens 2123, and an output lens 2124.

Here, the light valves 100R, 100G, and 100B have the same configuration as that of the display panel 100 in the above-described embodiment and are driven by image signals corresponding to the color R, G, and B supplied from the image signal supplying circuit (omitted in FIG. 8). In other words, in the projector 2100, there is used a structure in which three sets of an electro-optical device including the display panel 100 are provided for each color R, C, or B and image data for each color R, G, or B is supplied.

The light modulated by the light valves 100R, 100C, and 100B are incident to a dichroic prism 2112 from three directions. In the dichroic prism 2112, light of the colors R and B are refracted by 90 degrees and light of the color C goes straight. Accordingly, a color image is projected on a screen 2120 by a projection lens 2114, after images of each color are composed.

Since light corresponding to the primary colors of R, G, and B is incident onto the light valves 100R, 100G, and 100B by the two dichroic mirrors 2108, as described above, a color filter is not required. While projected images from the light valves 100R and 100B are projected after being reflected by the dichroic mirror 2112, a projected image from the light valve 100G is directly projected, and accordingly, a horizontal scan direction guided by the light valves 100R and 100B becomes a reverse of a horizontal scan direction guided by the light valve 100G, whereby an image in which right and left sides are inverted is displayed.

As examples for an electronic device other than the device described with reference to FIG. 10, there are a television set, a view finder-type monitor, direct view-type video cassette recorder, a car navigator, a pager, an electronic diary, an electronic calculator, a word processor, a workstation, an video telephone, a POS terminal, a digital still camera, a cellular phone, a device having a touch panel. It is needless to say that an electro-optical device according to an embodiment of the invention may be applied to the above-described various electronic devices.

The entire disclosure of Japanese Patent Application No. 2006-323106, filed Nov. 30, 2006 is expressly incorporated by reference herein.

What is claimed is:

1. An electro-optical device comprising:
pixels that are provided corresponding to intersections of a plurality of scanning lines and a plurality of data lines and have gray scale levels in accordance with voltage levels of data signals supplied to the data lines corresponding to the pixels at a time when the scanning lines corresponding to the pixels are selected;

image signal lines supplied with data signals that have voltage levels between a high voltage level and a low voltage level with respect to a predetermined reference electric potential;

a sampling signal output circuit that sequentially outputs sampling signals in a predetermined order to each data line or to each two or more data lines grouped into blocks;

sampling switches that are provided in the plurality of data lines and that sample the data signals supplied to the image signal lines to the data lines that correspond to the sampling switches in accordance with the sampling signals;

a scanning line driving circuit that sequentially selects each of the plurality of scanning lines in a predetermined order;

capacitors that are provided in the plurality of data lines and that each have a first end and a second end, the first ends being connected to the data lines corresponding to the capacitors; and inverted image signal lines connected to the second ends of the capacitors, and that are supplied with inverted data signals generated by inverting the voltage levels of the data signals supplied to the image signal lines with respect to a predetermined electric potential.

2. The electro-optical device according to claim 1,
wherein the sampling switches are first transistors, gate electrodes of which are supplied with the sampling signals, source electrodes of which are connected to the image signal lines, and drain electrodes of which are connected to the data lines, and
wherein the capacitors are second transistors in a turned off status that are interposed between the inverted image signal lines and the data lines.

3. The electro-optical device according to claim 1,
wherein the second transistors connect the data lines corresponding thereto to the inverted image signal lines at a time when the sampling signals are output in a test mode and become in a turned off status in a display mode.

4. An electronic apparatus having the electro-optical device according to claim 1.

* * * * *